(12) United States Patent
Phinisee et al.

(10) Patent No.: US 12,571,687 B2
(45) Date of Patent: Mar. 10, 2026

(54) SENSOR SYSTEM WITH HEATING

(71) Applicant: Ford Global Technologies, LLC,
Dearborn, MI (US)

(72) Inventors: Rashaun Phinisee, Ypsilanti, MI (US);
Venkatesh Krishnan, Canton, MI (US);
LaRon Michelle Brown, Detroit, MI
(US); Segundo Baldovino, Novi, MI
(US)

(73) Assignee: Ford Global Technologies, LLC,
Dearborn, MI (US)

( * ) Notice: Subject to any disclaimer, the term of this
patent is extended or adjusted under 35
U.S.C. 154(b) by 1203 days.

(21) Appl. No.: 17/484,127

(22) Filed: Sep. 24, 2021

(65) Prior Publication Data

US 2023/0095150 A1 Mar. 30, 2023

(51) Int. Cl.
*G01K 7/02* (2021.01)
*B60S 1/02* (2006.01)
(Continued)

(52) U.S. Cl.
CPC .............. *G01K 7/02* (2013.01); *F24H 3/022*
(2013.01); *F24H 9/2071* (2013.01); *G01K*
*1/026* (2013.01);
(Continued)

(58) Field of Classification Search
CPC ... B60R 11/04; B60R 11/02; B60R 2011/004;
B60R 2300/103; B61K 9/08; B61K 9/10;
B61L 23/045; B61L 2205/04; B61L 23/047; B61L 23/00; B61L 23/044; B61L
23/048; B61L 15/0054; B61L 25/02;
B61L 25/025; B61L 2205/00; B61L
25/06; B61L 27/70;
(Continued)

(56) References Cited

U.S. PATENT DOCUMENTS 9,796,359 B2 10/2017 Field et al.
10,035,498 B2 7/2018 Richardson et al.
(Continued)

FOREIGN PATENT DOCUMENTS

DE 102014213282 A1 1/2016
WO WO-2014006500 A2 * 1/2014 ......... G02B 27/0006
WO 2020158939 A1 8/2020

*Primary Examiner* — John E Breene
*Assistant Examiner* — Janice M Soto
(74) *Attorney, Agent, or Firm* — Frank A. MacKenzie;
Brooks Kushman P.C.

(57) ABSTRACT

A sensor system includes a sensor and a plurality of panels
connected to each other in a loop around the sensor. A duct
is positioned to direct air towards the sensor. A heating
element is disposed in the duct. First and second valves are
disposed in the duct and spaced from each other along the
duct. The first and second valves are selectively actuatable
between an open position permitting airflow through the
duct and a closed position blocking airflow through the duct.
A computer is communicatively coupled to the heating
element and the first and second valves. The computer is
programmed to, upon determining a first difference between
one respective panel temperature and an ambient tempera-
ture is greater than a first threshold, actuate the second valve
to the closed position and maintain the first valve in the open
position. The computer is further programmed to actuate the
heating element to a first heating level based on the first
difference.

23 Claims, 10 Drawing Sheets

(51) Int. Cl.

| | |
|---|---|
| *B60S 1/52* | (2006.01) |
| *F24H 3/02* | (2022.01) |
| *F24H 9/20* | (2022.01) |
| *G01K 1/02* | (2021.01) |
| *G01K 1/14* | (2021.01) |
| *G01K 3/00* | (2006.01) |
| *G02B 27/00* | (2006.01) |
| *G05D 7/06* | (2006.01) |
| *G05D 23/19* | (2006.01) |
| *G05D 23/22* | (2006.01) |

(52) U.S. Cl.
CPC ............... *G01K 1/14* (2013.01); *G01K 3/005* (2013.01); *G02B 27/0006* (2013.01); *G05D 7/0647* (2013.01); *G05D 23/1931* (2013.01); *G05D 23/22* (2013.01); *B60S 1/026* (2013.01); *B60S 1/52* (2013.01); *F24H 2250/02* (2013.01)

(58) Field of Classification Search
CPC ......... B61L 99/002; G06T 2207/10028; G06T 2207/30252; G06T 2207/30136; G06T 2207/30236; G06T 7/0004; G06T 7/55; G06T 7/73; G06T 2207/10012; G06T 2207/10016; G06T 2207/20076; G06T 2207/20081; G06T 2207/20084; G06T 2207/30192; G06T 7/20; G06T 7/246; G06T 7/277; G06T 7/593; G06T 7/70; G06V 20/56; G06V 10/764; G06V 20/58; B60G 2202/152; B60G 2500/205; G03B 15/00; G03B 17/08; G03B 17/55; G03B 19/22; G03B 30/00; H04N 23/51; H04N 13/189; H04N 13/243; H04N 23/54; H04N 23/55; H04N 23/57; H04N 23/698; H04N 23/90; H04N 23/811; H04N 7/185; H04N 13/239; H04N 2213/001; H04N 23/00; H04N 23/52; H04N 23/56; H04N 23/63; H04N 23/66; H04N 23/661; H04N 23/74; B60H 1/0025; B60H 1/00271; B05B 1/08; B05B 1/04; B05B 15/40; B05B 9/0423; B05B 1/06; B05B 15/70; B05B 17/0661; B05B 17/0669; B05B 5/087; B05B 7/0815; F26B 5/02; G05D 23/1919; G05D 1/0088; G05D 7/0652; G05D 7/0647; G05D 23/1931; G05D 23/22; G05D 23/19; B01D 53/263; B06B 1/023; B06B 1/0284; B06B 1/06; F04B 41/06; F04B 49/007; F04B 49/02; F04B 49/035; F04B 49/22; F04B 49/24; B08B 3/02; B08B 7/028; B08B 7/0064; B08B 7/04; G01B 11/25; G01D 11/245; G01D 11/26; G01D 5/245; G01S 19/45; G01S 19/48; G01S 19/50; G01S 17/42; G01S 17/86; G01S 17/87; G01S 17/89; G01S 7/4813; G01S 7/497; B60S 1/56; B60S 1/0848; B60S 1/488; B60S 1/52; B60S 1/487; B60S 1/50; B60S 1/54; B60S 1/02; B60S 1/0844; B60S 1/46; B60S 1/48; B60S 1/522; B60S 1/528; B60S 1/60; B60S 1/62; B60S 1/66; B60S 3/04; B60S 1/026; G02B 1/18; G02B 13/04; G02B 27/00; G02B 27/0006; G01K 7/02; G01K 1/026; G01K 1/14; G01K 3/005; G01K 3/14; F24H 3/022; F24H 9/2071; F24H 2250/02
USPC ......................................................... 701/29.1
See application file for complete search history.

(56)                      References Cited

U.S. PATENT DOCUMENTS

| | | | | |
|---|---|---|---|---|
| 2013/0219742 A1* | 8/2013 | Field | .................. | G02B 27/0006 |
| | | | | 34/565 |
| 2019/0275991 A1* | 9/2019 | Schmidt | .................. | B60S 1/56 |

* cited by examiner

SENSOR SYSTEM WITH HEATING

BACKGROUND

Autonomous vehicles typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

DETAILED DESCRIPTION

Figure 1:
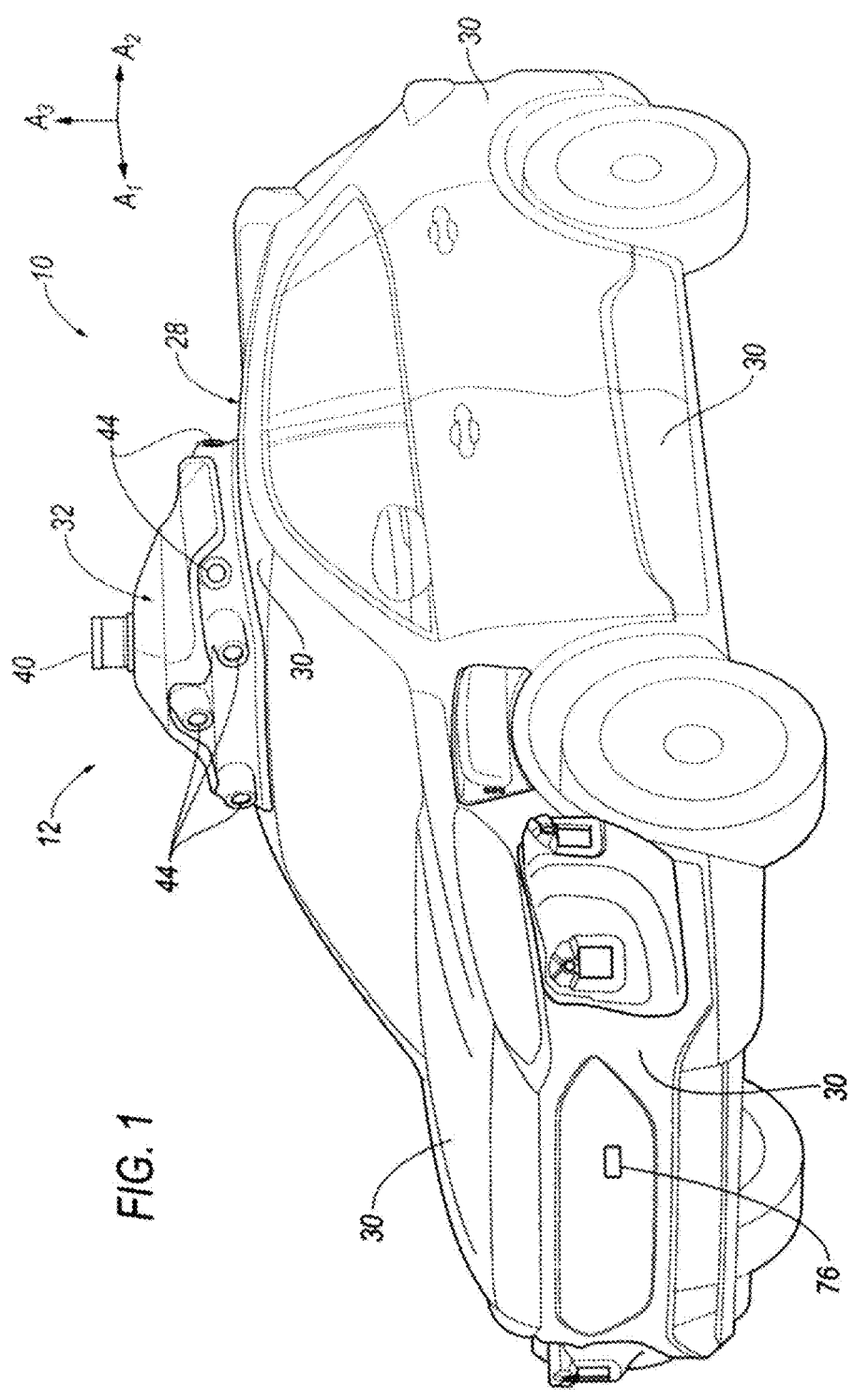
FIG. 1 is a perspective view of a vehicle including an example sensor system.

A sensor system includes a sensor and a plurality of panels connected to each other in a loop around the sensor. A duct is positioned to direct air towards the sensor. A heating element is disposed in the duct. A first valve and a second valve are disposed in the duct and spaced from each other along the duct. The first and second valves are selectively actuatable between an open position permitting airflow through the duct and a closed position blocking airflow through the duct. A computer is communicatively coupled to the heating element and the first and second valves. The computer is programmed to, upon determining a first difference between one respective panel temperature and an ambient temperature is greater than a first threshold, actuate the second valve to the closed position and maintain the first valve in the open position. The computer is further programmed to actuate the heating element to a first heating level based on the first difference.

The sensor system may include a housing including a chamber. The sensor, the panels, and the duct may be disposed in the chamber.

The sensor system may include an ambient temperature sensor communicatively coupled to the computer and spaced from the housing. The computer may be further programmed to receive the ambient temperature from the ambient temperature sensor.

The sensor may include a lens. The computer may be further programmed to, based additionally on a second difference between a lens temperature and the ambient temperature being greater than the first threshold, actuate the second valve to the closed position and maintain the first valve in the open position.

The sensor system may include a lens thermocouple communicatively coupled to the computer and extending circumferentially around the lens. The computer may be further programmed to receive the lens temperature from the lens thermocouple.

The computer may be further programmed to, upon determining that the first difference is less than or equal to the first threshold and that the second difference is less than or equal to the first threshold, maintain the first and second valves in the open position.

The computer may be further programmed to actuate the heating element to a second heating level based on the second difference.

The sensor system may include a plurality of panel thermocouples communicatively coupled to the computer and embedded in respective panels. The computer may be further programmed to receive the panel temperatures from the respective panel thermocouples.

The computer may be further programmed to, upon determining that a difference between an air temperature at the second valve and an air temperature at the first valve is greater than a second threshold, actuate the first valve to the closed position and the second valve to the open position.

The sensor system may include two temperature sensors communicatively coupled to the computer and disposed adjacent to the respective valves in the duct. The computer may be further programmed to receive the air temperatures at the respective valves from the respective temperature sensors.

The computer may be further programmed to stop the heating element based on detecting the first valve in the closed position.

The sensor system may include a blower coupled to the duct. The computer may be communicatively coupled to the blower. The computer may be further programmed to activate the blower based on detecting the second valve in the closed position. The computer may be further programmed to stop the blower based on detecting the first valve in the closed position.

The heating element may be disposed between the blower and the first valve.

The first valve may be disposed between the heating element and the second valve.

The computer may be further programmed to, upon determining that at least one panel temperature is outside of a predetermined range relative to at least one other panel temperature, actuate the second valve to the closed position and maintain the first valve in the open position. The computer may be further programmed to activate the heating element to a predetermined heating level.

The sensor system may include a blower coupled to the duct. The computer may be communicatively coupled to the blower. The computer may be further programmed to activate the blower based on detecting the second valve in the closed position. The computer may be further programmed to stop the blower based on detecting the first valve in the closed position.

The computer may be further programmed to, upon determining that a difference between an air temperature at the second valve and an air temperature at the first valve is greater than a second threshold, actuate the first valve to the closed position and the second valve to the open position The computer may be further programmed to stop the heating element based on detecting the first valve in the closed position.

With reference to the Figures, wherein like numerals indicate like parts throughout the several views, a sensor system 12 for a vehicle 10 includes a sensor 14 and a plurality of panels 16 connected to each other in a loop around the sensor 14. A duct 18 is positioned to direct air towards the sensor 14. A heating element 20 is disposed in the duct 18. A first valve 22 and a second valve 24 are disposed in the duct 18 and are spaced from each other along the duct 18. The first and second valves 22, 24 are selectively actuatable between an open position permitting airflow through the duct 18 and a closed position blocking airflow through the duct 18. A computer 26 is communicatively coupled to the heating element 20 and the first and second valves 22, 24. The computer 26 is programmed to, upon determining a first difference between one respective panel temperature $T_p$ and an ambient temperature $T_{amb}$ is greater than a first threshold, actuate the second valve 24 to the closed position and maintain the first valve 22 in the open position. The computer 26 is further programmed to actuate the heating element 20 to a first heating level $H_1$ based on the first difference $D_1$.

The sensor system 12 can remove ice as well as eliminate or prevent condensation on the sensor 14. The sensor system 12 can do so in an energy-efficient manner by activating the heating element 20 to the first heating level $H_1$ to eliminate or prevent condensation and activating the heating element 20 to a predetermined heating level $H_p$ (as discussed below) to remove ice. The sensor system 12 pre-heats air in the duct 18 by closing the second valve 24 until a difference D between air temperatures $T_1$, $T_2$ at the first and second valves 22, 24, respectively is above a second threshold. Upon determining that the difference D is greater than the second threshold, the second valve 24 is opened to exhaust the pre-heated air across the sensor 14. When exhausting the pre-heated air, the first valve 22 can be closed to reduce exhaustion of non-preheated air towards the sensor 14. The pre-heating of the air in the duct 18 via the heating element 20 can provide heating for the sensor 14 without causing distortion of the sensor 14.

With reference to FIG. 1, the vehicle 10 may be any passenger or commercial automobile such as a car, a truck, a sport utility vehicle, a crossover, a van, a minivan, a taxi, a bus, etc.

The vehicle 10 defines a longitudinal axis $A_1$, e.g., extending between a front and a rear of the vehicle 10. The vehicle 10 defines a lateral axis $A_2$, e.g., extending between a left side and a right side of the vehicle 10. The vehicle 10 defines a vertical axis $A_3$, e.g., extending between a top and a bottom of the vehicle 10. The longitudinal axis $A_1$, the lateral axis $A_2$, and the vertical axis $A_3$ are perpendicular to each other.

The vehicle 10 may be an autonomous or semi-autonomous vehicle. A vehicle computer can be programmed to operate the vehicle 10 independently of the intervention of a human driver, completely or to a lesser degree. The vehicle computer may be programmed to operate a propulsion, brake system, steering, and/or other vehicle systems based at least in part on data received from one or more sensors 14, as well as a scanning sensor 40 described below. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 10 includes a body 28. The vehicle 10 may be of a unibody construction, in which a frame and the body 28 of the vehicle 10 are a single component. The vehicle 10 may, alternatively, be of a body-on-frame construction, in which the frame supports the body 28 that is a separate component from the frame. The frame and body 28 may be formed of any suitable material, for example, steel, aluminum, etc.

The body 28 includes body panels 30 partially defining an exterior of the vehicle 10. The body panels 30 may present a class-A surface, e.g., a finished surface exposed to view by a customer and free of unaesthetic blemishes and defects. The body panels 30 include, e.g., a roof, etc.

The sensor system 12 includes a housing 32 that is attachable to the vehicle 10, e.g., to one of the body panels 30 of the vehicle 10, e.g., the roof. The sensors 14 and the scanning sensor 40 are supported by and/or disposed in the housing 32. The housing 32 may be shaped to be attachable to the roof, e.g., may have a shape matching a contour of the roof. The housing 32 may be attached to the roof, which can provide the sensors 14 and the scanning sensor 40 with an unobstructed field of view of an area around the vehicle 10. The housing 32 may be formed of, e.g., plastic or metal.

The sensor system 12 can include an ambient temperature sensor 76. The ambient temperature sensor 76 detects a temperature of a surrounding environment or an object in contact with the ambient temperature sensor 76. The ambient temperature sensor 76 may be any device that generates an output correlated with temperature, e.g., a thermometer, a bimetallic strip, a thermistor, a thermocouple, a resistance thermometer, a silicon bandgap temperature sensor, etc. In particular, the ambient temperature sensor 76 can be an outside air temperature sensor (OATS) that detects the ambient temperature, i.e., the temperature of the ambient environment. The ambient temperature sensor 76 is mounted to the vehicle 10 and spaced from the housing 32. For example, the ambient temperature sensor 76 may be mounted to a front end, e.g., a grill, of the vehicle 10.

Figure 2:
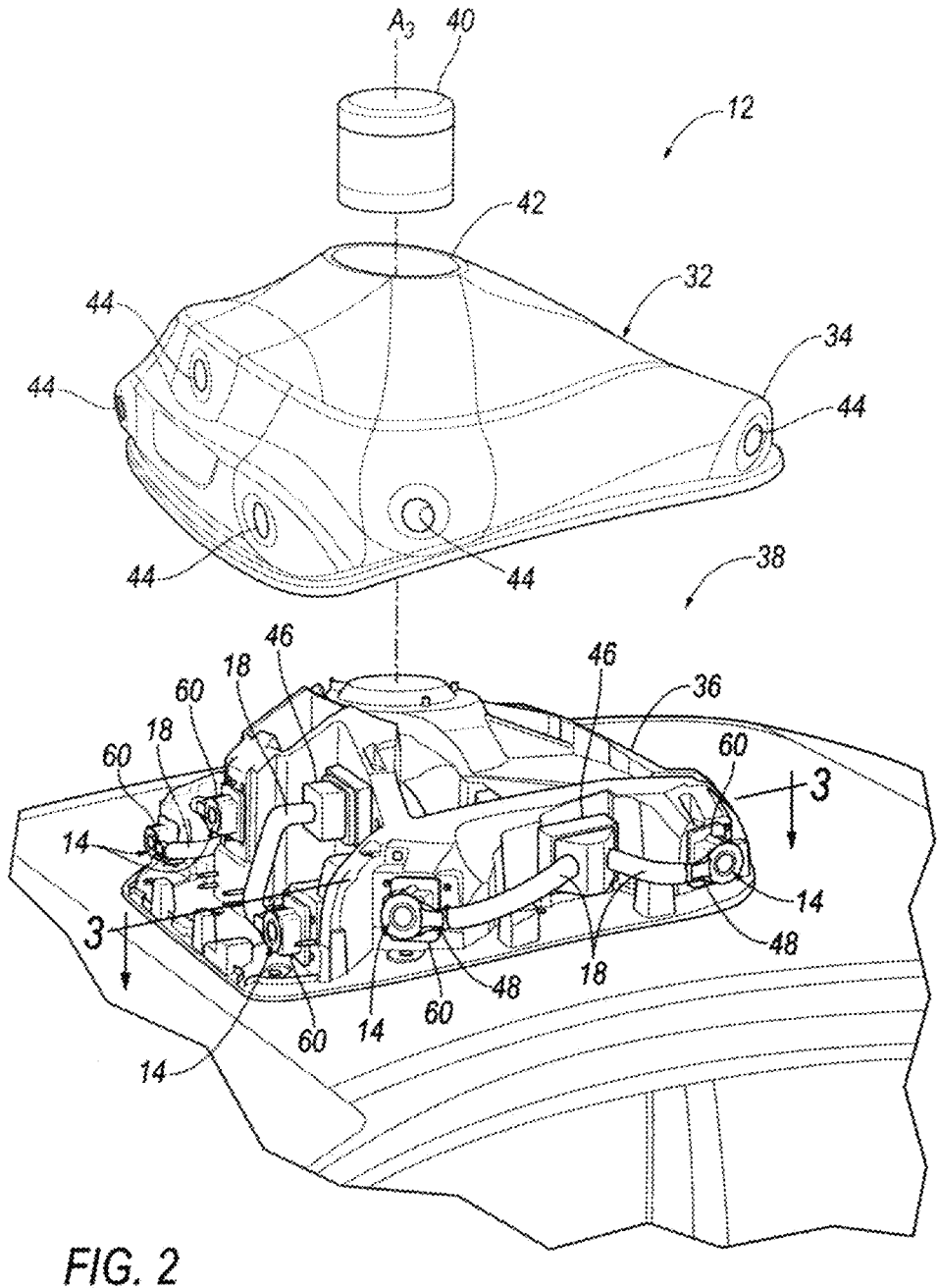
FIG. 2 is an exploded view of the sensor system.

With reference to FIG. 2, the housing 32 includes a housing upper piece 34 and a housing lower piece 36. The housing upper piece 34 and the housing lower piece 36 are shaped to fit together, with the housing upper piece 34 fitting on top of the housing lower piece 36. The housing upper piece 34 covers the housing lower piece 36. The housing 32 may enclose and define a chamber 38; for example, the housing upper piece 34 and the housing lower piece 36 may enclose and define the chamber 38. The housing 32 may shield contents of the chamber 38 from external elements such as wind, rain, debris, etc.

The housing upper piece 34 includes a central opening 42 that exposes the housing lower piece 36. The central opening 42 is round, e.g., has a circular or slightly elliptical shape. The housing upper piece 34 and the housing lower piece 36 are each monolithic. For the purposes of this disclosure, "monolithic" means a single-piece unit, i.e., a continuous piece of material without any fasteners, joints, welding, adhesives, etc., fixing multiple pieces to each other. For example, the housing upper piece 34 and the housing lower piece 36 may be stamped or molded as a single piece.

With continued reference to FIG. 2, the housing upper piece 34 may include apertures 44. The apertures 44 are holes in the housing upper piece 34 leading from the chamber 38 into the ambient environment. That is, the apertures 44 extend through the housing upper piece 34. The apertures 44 may be any suitable shape, e.g., circular. The housing upper piece 34 includes one aperture 44 for each sensor 14. Each sensor 14 has a field of view received through the respective aperture 44.

The sensor system 12 includes the sensors 14 and the scanning sensor 40. The sensors 14 may detect the location and/or orientation of the vehicle 10. For example, the sensors 14 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 14 may detect the external world, e.g., objects and/or characteristics of surroundings of the vehicle 10, such as other vehicles, road lane markings, traffic lights and/or signs, pedestrians, etc. For example, the sensors 14 may include radar sensors, scanning laser range finders, light detection and ranging (LIDAR) devices, and image processing sensors such as cameras. The sensors 14 may include communications devices, for example, vehicle-to-infrastructure (V2I) or vehicle-to-vehicle (V2V) devices.

With continued reference to FIG. 2, the scanning sensor 40 may be disposed outside the housing 32. The scanning sensor 40 protrudes upward from the housing upper piece 34, as shown in FIGS. 1 and 2. The scanning sensor 40 may be a camera, a LIDAR device, a radar sensor, etc. The scanning sensor 40 is disposed above the housing lower piece 36 to have an unobstructed 360° horizontal field of view. For example, the scanning sensor 40 may be supported by the housing upper piece 34. In this situation, the scanning sensor 40 may extend at least partially through the housing upper piece 34 into the chamber 38, e.g., via the central opening 42. The scanning sensor 40 may be fixed relative to the housing upper piece 34 in the chamber 38, e.g., via fasteners, clips, etc. The scanning sensor 40 may be positioned laterally, i.e., along a left-right dimension A2 relative to the vehicle 10, in a middle of the vehicle 10. The scanning sensor 40 may have a cylindrical shape defining an axis (not shown) that is oriented substantially vertically.

The sensors 14 may be disposed in the housing 32, specifically in the chamber 38. The sensors 14 may be attached directly to the body panel 30 in the chamber 38, or the sensors 14 may be attached to the housing lower piece 36 in the chamber 38, which in turn is directly attached to the roof. The sensors 14 may be cameras arranged to collectively cover a 360° field of view with respect to a horizontal plane. Each sensor 14 has a field of view through the respective lens 58 and the respective aperture 44, and the field of view of one sensor 14 may overlap the fields of view of the sensors 14 that are circumferentially adjacent to one another, i.e., that are immediately next to each other.

With continued reference to FIG. 2, the sensor system 12 includes a blower 46 positioned to direct air across at least one sensor 14. The blower 46 is supported by the housing lower piece 36. For example, the blower 46 may be mounted to the housing lower piece 36. For example, the blower 46 may include locating elements, fasteners, etc., that engage the housing lower piece 36. Additionally, or alternatively, fasteners may engage the blower 46 and the housing lower piece 36 to mount the blower 46 to the housing lower piece 36.

The blower 46 may include an electric motor, a fan, or other suitable structure for moving air. The blower 46 moves air towards the at least one sensor 14, e.g., between an intake and an exhaust. The blower 46 may be configured to draw air via the intake and exhaust air via the exhaust towards the at least one sensor 14. The intake of the blower 46 is in fluid communication with the chamber 38, and the exhaust of the blower 46 is in fluid communication with at least one duct 18. That is, the blower 46 pulls air from the chamber 38 and urges air to flow out of the exhaust, through the duct 18, to (and out of) the air nozzle 48, and across the lens 58 of the at least one sensor 14.

The blower 46 may be coupled to and in fluid communication with any suitable number of ducts 18, e.g., one or more. As one example, the blower 46 may be coupled to and in fluid communication with one duct 18. In such an example, the blower 46 may blow air into the duct 18, e.g., such that the blower 46 creates a positive pressure in the duct 18. As another example, the blower 46 may be coupled to and in fluid communication with two ducts 18. In such an example, the blower 46 may blow air into both ducts 18, e.g., such that the blower 46 creates a positive and equal pressure in the two ducts 18.

The sensor system 12 may include any suitable number of blowers 46. For example, the sensor system 12 may include one blower 46 for each sensor 14. In such an example, each blower 46 may blow air across one respective sensor 14. As another example, the sensor system 12 may include fewer blowers 46 than sensors 14, as shown in FIG. 2. In such an example, at least some of the blowers 46 may blow air across a respective plurality of sensors 14.

With continued reference to FIG. 2, the sensor system 12 may include a same number of ducts 18 as sensors 14. The sensors 14 may be spaced from each other within the chamber 38 such that each duct 18 extends toward one respective sensor 14. Each duct 18 extends from one blower 46 to one air nozzle 48. Specifically, each duct 18 is coupled to one blower 46 and one air nozzle 48. That is, each duct 18 is fluidly connected to one blower 46 such that air exhausted by the blower 46 enters the duct 18 and is fluidly connected to one air nozzle 48 such that air exhausted by the duct 18 enters the air nozzle 48. Said differently, each duct 18 receives air from one blower 46, e.g., the exhaust, and directs air to one respective air nozzle 48.

The ducts 18 are disposed in the chamber 38. The ducts 18 may be supported by the housing 32, as shown in FIG. 2. For example, the ducts 18 may be fixed to the housing lower piece 36, e.g., via fasteners, clips, adhesives, etc.

Figure 3A:
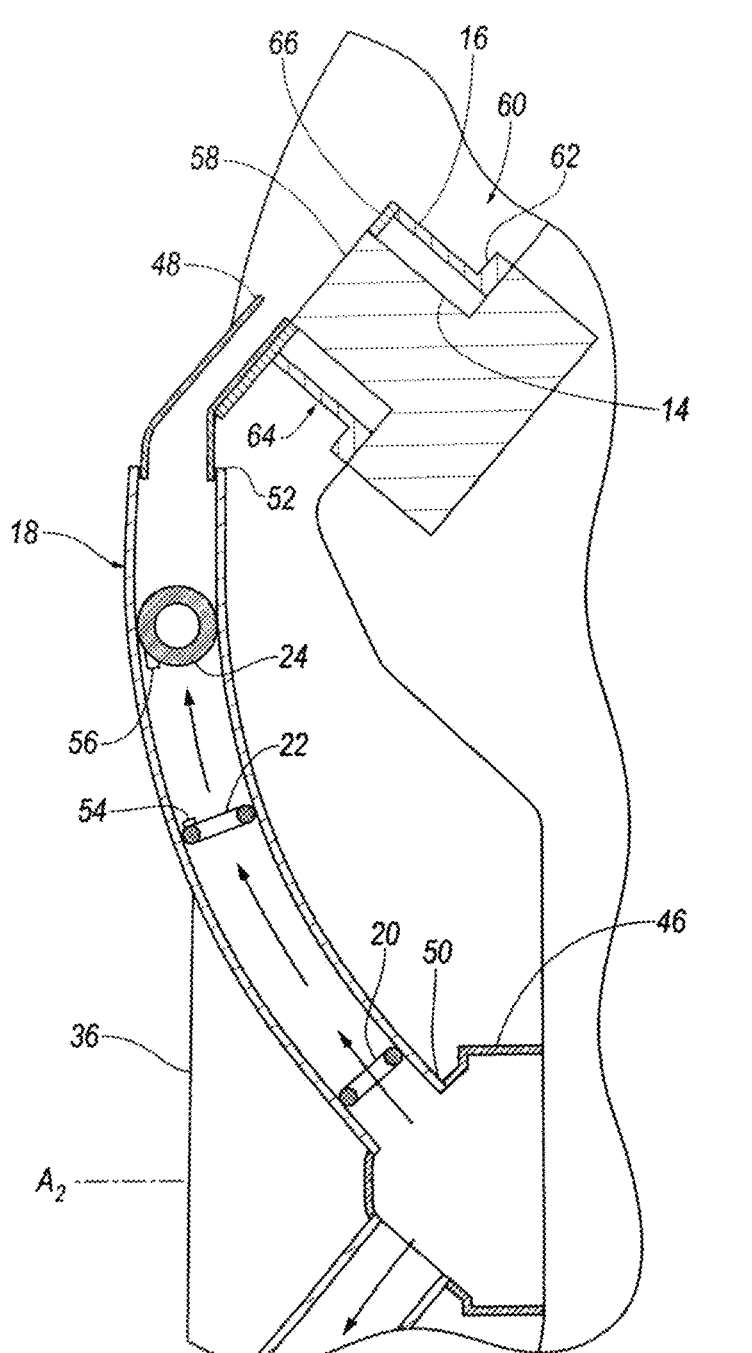
FIG. 3A is a cross-section view of the sensor system along line 3 in FIG. 2 with a first valve in an open position and a second valve in a closed position.
Figure 3B:
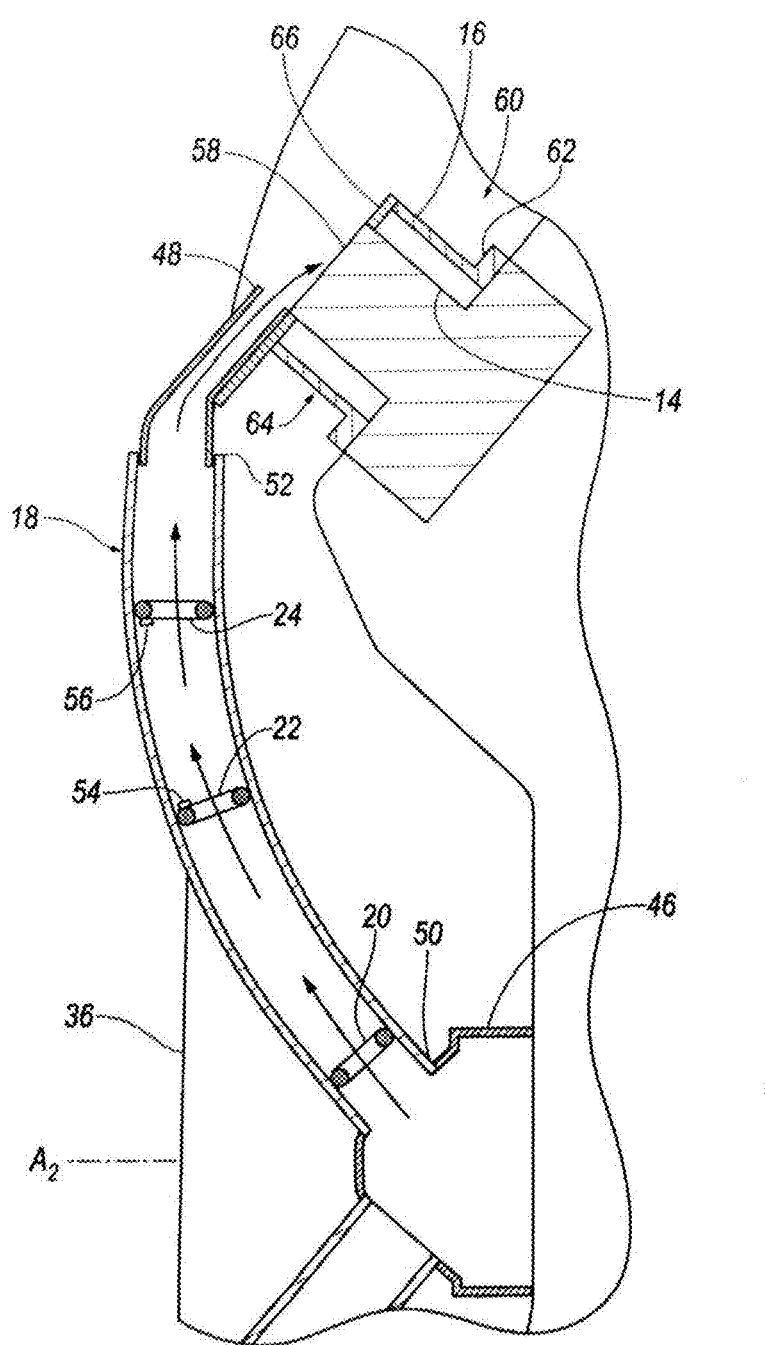
FIG. 3B is cross-section view of the sensor system along line 3 in FIG. 2 with the first and second valves in the open position.
Figure 3C:
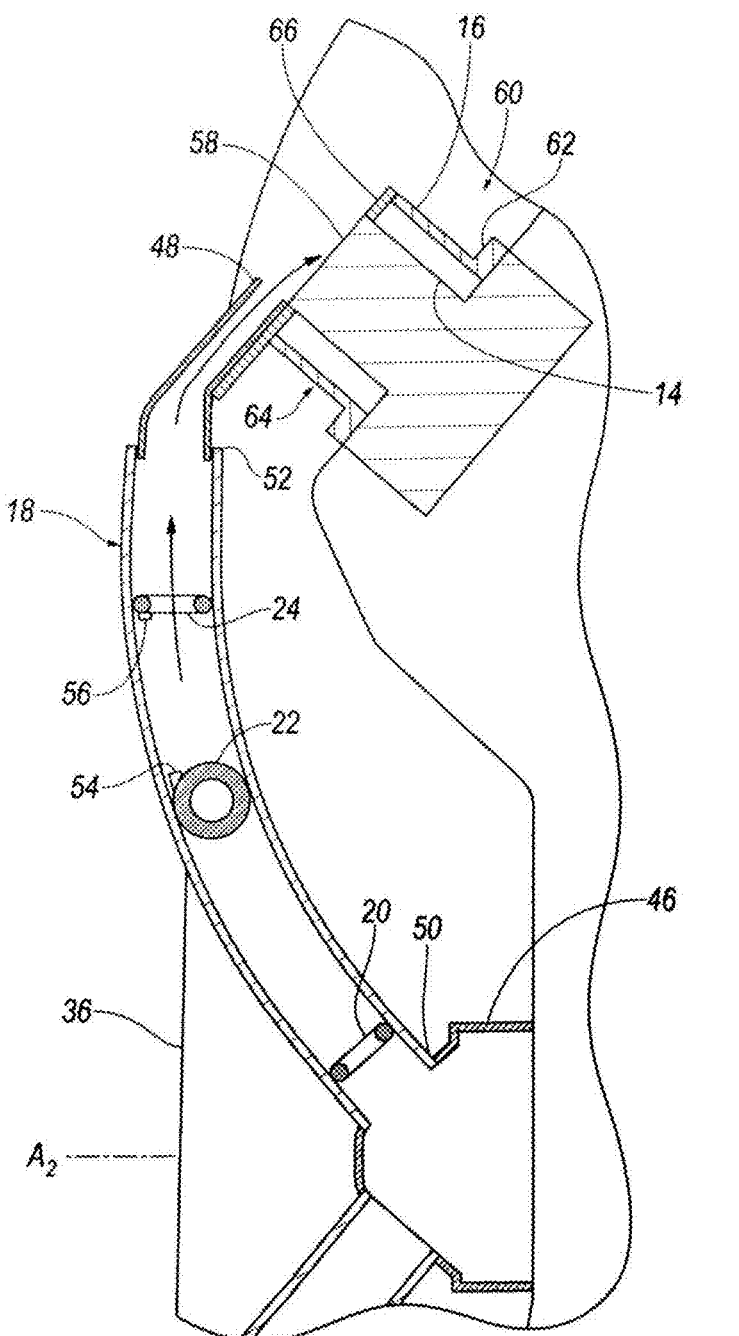
FIG. 3C is a cross-section view of the sensor system along line 3 in FIG. 2 with the first valve in the closed position and the second valve in the open position.

Turning now to FIGS. 3A-3C, the duct 18 extends from a first end 50 to a second end 52. The ducts 18 define respective flow paths from the first end 50 to the second end 52. A cross-sectional area of each duct 18 normal to the flow path may, for example, be uniform from the first end 50 to the second end 52, e.g., to maintain a speed of the air flowing through the respective duct 18. As another example, the cross-sectional area may vary between the first end 50 to the second end 52, e.g., to change the speed of the air flowing through the duct 18.

The first end 50 of the duct 18 is coupled to the blower 46, e.g., the exhaust. Specifically, the first end 50 of the duct 18 is fluidly connected to the blower 46 such that air exhausted by the blower 46 enters the duct 18. The second end 52 of the duct 18 is coupled to the air nozzle 48. Specifically, the second end 52 of the duct 18 is fluidly connected to the air nozzle 48 such that air exhausted by the duct 18 enters the air nozzle 48.

With continued reference to FIGS. 3A-3C, the first and second valves 22, 24 are disposed in the duct 18, as set forth above. The first valve 22 may be disposed between the first end 50 and the second valve 24, and the second valve 24 may be disposed between the first valve 22 and the second end 52. The first and second valves 22, 24 may be spaced from each other by a first predetermined distance along the duct 18. The first predetermined distance may be determined empirically, e.g., based on testing that allows for determining a distance, for a given diameter of a duct, at which a difference between air temperatures at the respective valves 22, 24 can be achieved that is sufficient to transfer heat from the air to the sensor 14 to remove ice and condensation within a desired time period. Additionally, the second valve 24 may be spaced from the second end 52 of the duct 18 by a second predetermined distance. The second predetermined distance may be determined empirically, e.g., based on testing that allows for determining a distance at which the pre-heated air can travel and transfer sufficient heat to the sensor 14 to remote ice and condensation within the desired time period.

Each valve 22, 24 may include an actuator (not shown), e.g., an electric motor or some other suitable structure, configured to move the respective valve 22, 24 between the opened position and the closed position. The first and second valves 22, 24 are independently actuatable between the open position and the closed position. In other words, one of the valves 22, 24 can be opened or closed within changing the status of the other valve 22, 24. For example, FIG. 3A shows the first valve 22 in the open position and the second valve 24 in the closed position, FIG. 3B shows the first and second valves 22, 24 in the open positions, and FIG. 3C shows the first valve 22 in the closed position and the second valve 24 in the open position. The first and second valves 22, 24 are positioned to permit or block air flow from the first end 50 to the second end 52 of the duct 18, i.e., from the blower 46 to the air nozzle 48. The first and second valves 22, 24 may be a same or different type of valve. The first and second valves 22, 24 may be any suitable type of valve, e.g., needle valves, gate valves, ball valves, butterfly valves, globe valves, diaphragm valves, pinch valves, etc.

A first temperature sensor 54 may be mounted to the first valve 22. Alternatively, the first temperature sensor 54 may be mounted to the duct 18 adjacent to the first valve 22. The first temperature sensor 54 may be disposed between the first end 50 and the first valve 22, or between the first and second valves 22, 24. The first temperature sensor 54 detects the temperature $T_1$ of the air in the duct 18 adjacent to the first valve 22.

A second temperature sensor 56 may be mounted to the second valve 24. Alternatively, the second temperature sensor 56 may be mounted to the duct 18 adjacent to the second valve 24. The second temperature sensor 56 may be disposed between the second end 52 and the second valve 24, or between the first and second valves 22, 24. The second temperature sensor 56 detects the temperature $T_2$ of the air in the duct 18 adjacent to the second valve 24. The first and second temperature sensors 54, 56 may be a same or different type of temperature sensor, e.g., as each other and/or as the ambient temperature sensor 76.

With continued reference to FIGS. 3A-3C, the heating element 20 is disposed in the duct 18, as set forth above. Specifically, the heating element 20 is disposed between the first end 50 of the duct and the first valve 22. The first valve

22 is disposed between the heating element 20 and the second valve 24. The heating element 20 may be spaced from the first valve 22 by any suitable amount. For example, the heating element 20 may be disposed closer to the first end 50, i.e., the blower 46, than to the first valve 22. The heating element 20 is positioned to heat air flowing through the duct 18 from the first end 50 to the second end 52. The heating element 20 may, for example, extend annularly about the flow path defined by the duct 18 such that the heating element 20 can heat the entire airflow in the duct 18, e.g., in a substantially uniform manner.

The heating element 20 can generate heating by resistive heating, also called Joule heating. The heating element 20 is a conductor, and the resistance of the heating element 20 to electrical current flowing through the heating element 20 generates the heat. The amount of heat generated by the heating element 20 can be adjusted by adjusting the electrical current flowing through the heating element 20.

Figure 4:
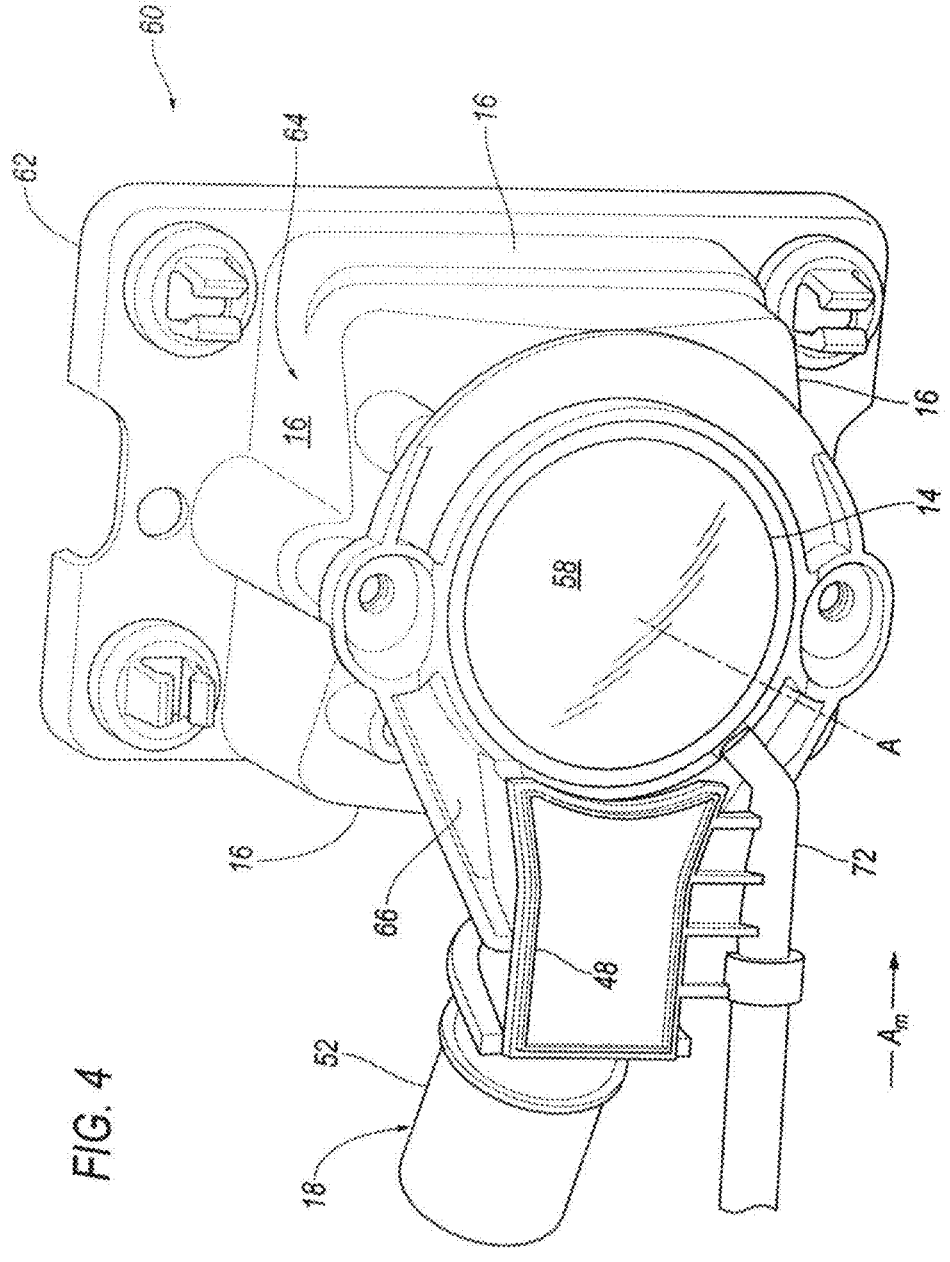
FIG. 4 is a perspective view of a portion of the sensor system with an air nozzle aimed at a lens of a sensor.

With reference to FIG. 4, the sensors 14 include respective lenses 58. Each lens 58 may define the field of view of the respective sensor 14 through the aperture 44. Each lens 58 may be convex. Each lens 58 defines an axis A, around which the lens 58 is radially symmetric. The axis A extends along a center of the field of view of the respective sensor 14.

The sensor system 12 may include a plurality of casings 60. Each casing 60 may be disposed in the chamber 38 and mounted to one respective sensor 14. The casing 60 extends completely around a barrel of the sensor 14. That is, the casing 60 shields the barrel of the sensor 14 from the chamber 38.

With continued reference to FIG. 4, each casing 60 may include a base portion 62, a tunnel portion 64, and a top panel 66. The tunnel portion 64 extends circumferentially around the axis A. For example, the tunnel portion 64 can include the panels 16, e.g., four panels 16, connected together in a circumferential loop around the axis A. The top panel 66 extends parallel to the lens 58, i.e., orthogonal to the axis A defined by the lens 58. The base portion 62 extends radially outward from the tunnel portion 64 relative to the axis A, and the top panel 66 extends radially inward from the tunnel portion 64 relative to the axis A. The top panel 66 and the base portion 62 can be parallel to each other.

The casing 60 is attached to the sensor 14. Specifically, the base portion 62 of the casing 60 can be attached to the sensor 14, and the rest of the casing 60 can be unattached to the sensor 14, as shown in FIGS. 3A-3C. The base portion 62 can be attached to the sensor 14 in any suitable manner, e.g., clips, fasteners, adhesive, etc. The tunnel portion 64 and the top panel 66 hang from the base portion 62 and extend around the lens 58 without being attached directly to the sensor 14 or the lens 58. This arrangement reduces vibrations experienced by the sensor 14.

Figure 5:
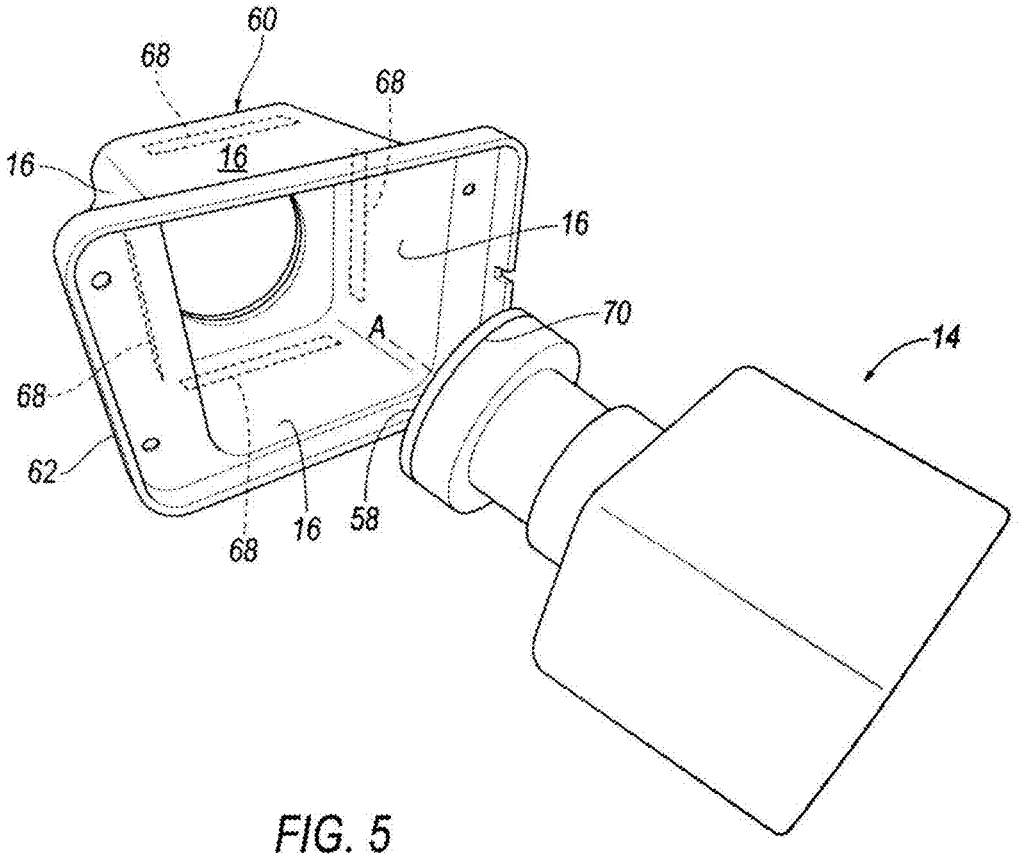
FIG. 5 is an exploded rear perspective of the sensor and a casing.

With reference to FIG. 5, the casing 60 may include a plurality of panel thermocouples 68, e.g., four panel thermocouples 68. For example, the casing 60 may include one panel thermocouple 68 for each panel 16. The panel thermocouples 68 may be thermally coupled to respective panels 16 of the casing 60. A thermocouple is an electrical device of two dissimilar electrical conductors forming an electrical junction and which produces a temperature-dependent voltage as a result of the thermoelectric effect. For the purposes of this disclosure, "thermally coupled" means attached such that heat may efficiently flow and both ends of the thermal coupling (if separate) are substantially the same temperature within a short time period. For example, the panel thermocouples 68 may be embedded in respective panels 16 of the casing 60. The voltages of the panel thermocouples 68 thus bring the respective panels 16 to respective panel temperatures $T_P$, i.e., a temperature of the respective panel 68, defined by the respective voltages.

A lens thermocouple 70 is thermally coupled to the lens 58. For example, the lens thermocouple 70 can contact a perimeter of the lens 58. The lens thermocouple 70 may extend circumferentially around the lens 58, i.e., around the axis A defined by the lens 58. The voltage returned by the thermocouple thus brings the lens 58 to a lens temperature $T_L$, i.e., a temperature of the lens 58, defined by the voltage.

Returning to FIG. 4, the air nozzle 48 may be mounted to the casing 60, specifically to the top panel 66. For example, the top panel 66 may include an overhanging portion extending radially outside the tunnel portion 64 relative to the axis A. The air nozzle 48 may be attached to the overhanging portion in any suitable manner, e.g., clips, fasteners, adhesive, etc.

The air nozzle 48 is aimed across and at the lens 58 so that air strikes the lens 58 at a shallow angle, e.g., less than 10°. Additionally, the air nozzle 48 may be aimed so that a direction of airflow from the air nozzle 48 is generally parallel to an ambient airflow $A_m$ during forward motion of the vehicle 10. That is, the air nozzles 48 may be aimed to direct airflow in various directions, e.g., based on a position of a respective sensor 14 relative to the vehicle 10. As used herein, "generally parallel" means that a horizontal component of the airflow from the air nozzle 48 is parallel to the ambient airflow $A_m$ during forward motion of the vehicle 10, even if the airflow from the air nozzle 48 has a vertical component that is transverse to the ambient airflow $A_m$. This arrangement can help minimize interference of the airflow from the air nozzle 48 by the ambient airflow $A_m$ during forward motion of the vehicle 10.

With continued reference to FIG. 4, the air nozzle 48 may be shaped to discharge air in a flat-fan pattern (not shown). For the purposes of this disclosure, a "flat-fan pattern" means that the discharge has an increasing width in one dimension as the discharge moves away from the air nozzle 48 and has a generally flat shape along a plane defined by the width and a direction of discharge. The direction of discharge is directed along a center of the spray pattern, i.e., bisecting the flat-fan pattern. The direction of discharge of the air nozzle is in a radially inward direction with respect to the axis A, i.e., a direction that is toward the axis A.

The spray pattern may cause the airflow from the air nozzle 48 to form an air curtain across the lens 58. For the purposes of this disclosure, an "air curtain" means a layer of moving air that has a width significantly greater than a thickness, that is close to a surface, and that is moving generally parallel to the surface. An air curtain can, for example, remove debris from the lens 58 as well as prevent debris from contacting the lens 58. As another example, the air curtain can dry, defog, and/or defrost the lens 58.

The sensor system 12 may include a plurality of fluid nozzles 72. The fluid nozzles 72 may maintain clarity of a field-of-view of a respective sensor 14, e.g., liquid exiting the fluid nozzles 72 may clean the lenses 58 of the sensors 14. Each fluid nozzle 72 may be mounted to one respective casing 60, specifically to the top panel 66, e.g., the overhanging portion, as shown in FIG. 4. The fluid nozzle 72 may be attached to the overhanging portion, e.g., in substantially the same manner as the air nozzle 48.

The fluid nozzle 72 is aimed across and at the lens 58 so that fluid strikes the lens 58 at a shallow angle, e.g., less than 10°. That is, the fluid nozzle 72 is aimed to direct fluid across the lens 58. Additionally, the fluid nozzle 72 may be aimed so that a direction of fluid from the fluid nozzle 72 is generally parallel to the ambient airflow $A_m$ during forward motion of the vehicle 10. This arrangement can help minimize interference of the fluid by the ambient airflow $A_m$ during forward motion of the vehicle 10.

The fluid nozzle 72 may be shaped to spray fluid in the flat-fan pattern (not shown). The fluid nozzle 72 has a direction of discharge directed along a center of the spray pattern, i.e., bisecting the flat-fan pattern. The direction of discharge of the fluid nozzle 72 is in a radially inward direction with respect to the axis A, i.e., a direction that is toward the axis A.

The direction of discharge of the fluid nozzle 72 is different than, i.e., transverse to, the direction of discharge of the air nozzle 48. For example, the fluid nozzle 72 may be circumferentially spaced from the air nozzle 48 about the axis A. As one example, the fluid nozzle 72 may be oblique to the air nozzle 48. This arrangement may assist in positioning the fluid nozzle 72 such that the fluid nozzle 72 does not interfere with the airflow from the air nozzle 48 and that sprayed fluid can contact the lens 58 at the desired shallow angle.

Figure 6:
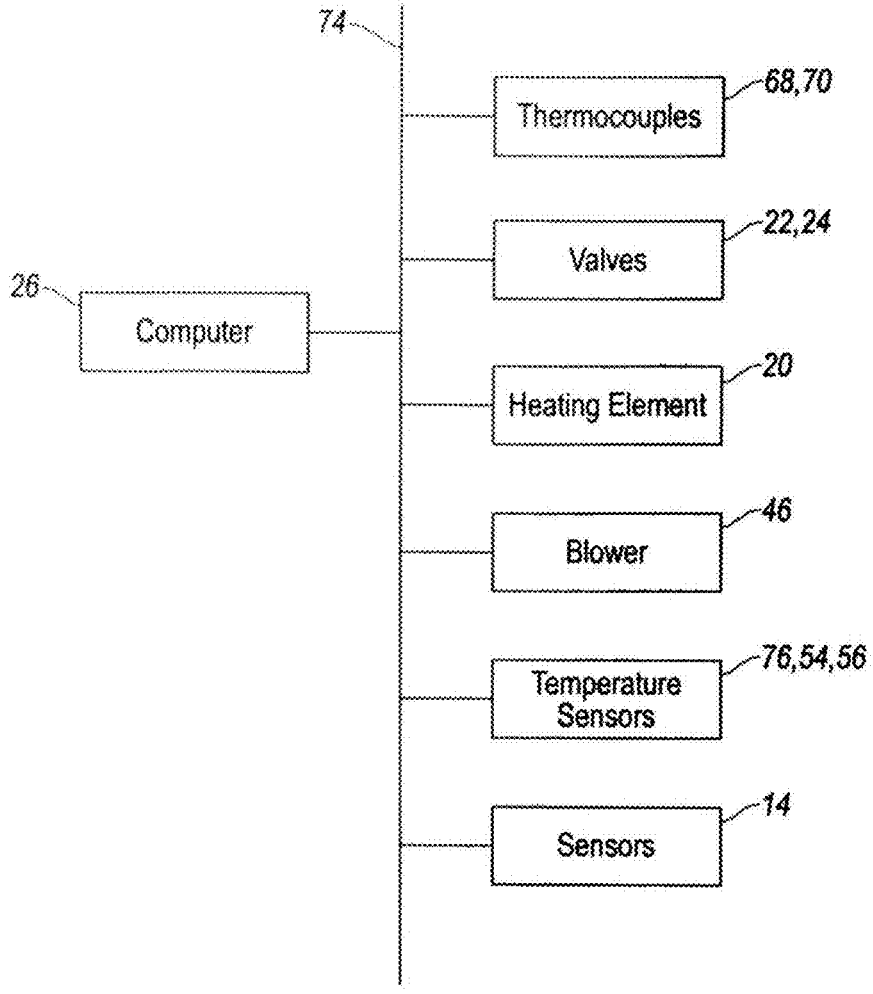
FIG. 6 is a block diagram of a control system for the sensor system.

With reference to FIG. 6, the computer 26 is a microprocessor-based computing device, e.g., a generic computing device including a processor and a memory, an electronic controller or the like, a field-programmable gate array (FPGA), an application-specific integrated circuit (ASIC), etc. The computer 26 can thus include a processor, a memory, etc. The memory of the computer 26 can include media for storing instructions executable by the processor as well as for electronically storing data and/or databases, and/or the computer 26 can include structures such as the foregoing by which programming is provided. The computer 26 can be multiple computers coupled together.

The computer 26 may transmit and receive data through a communications network 74 such as a controller area network (CAN) bus, Ethernet, WiFi, Local Interconnect Network (LIN), onboard diagnostics connector (OBD-II), and/or by any other wired or wireless communications network. The computer 26 may be communicatively coupled to the sensors 14, the temperature sensors 54, 56, 76, the panel thermocouples 68, the lens thermocouple 70, the heating element 20, the first and second valves 22, 24, e.g., the respective actuators, and other components via the communications network 74.

Figure 7A:
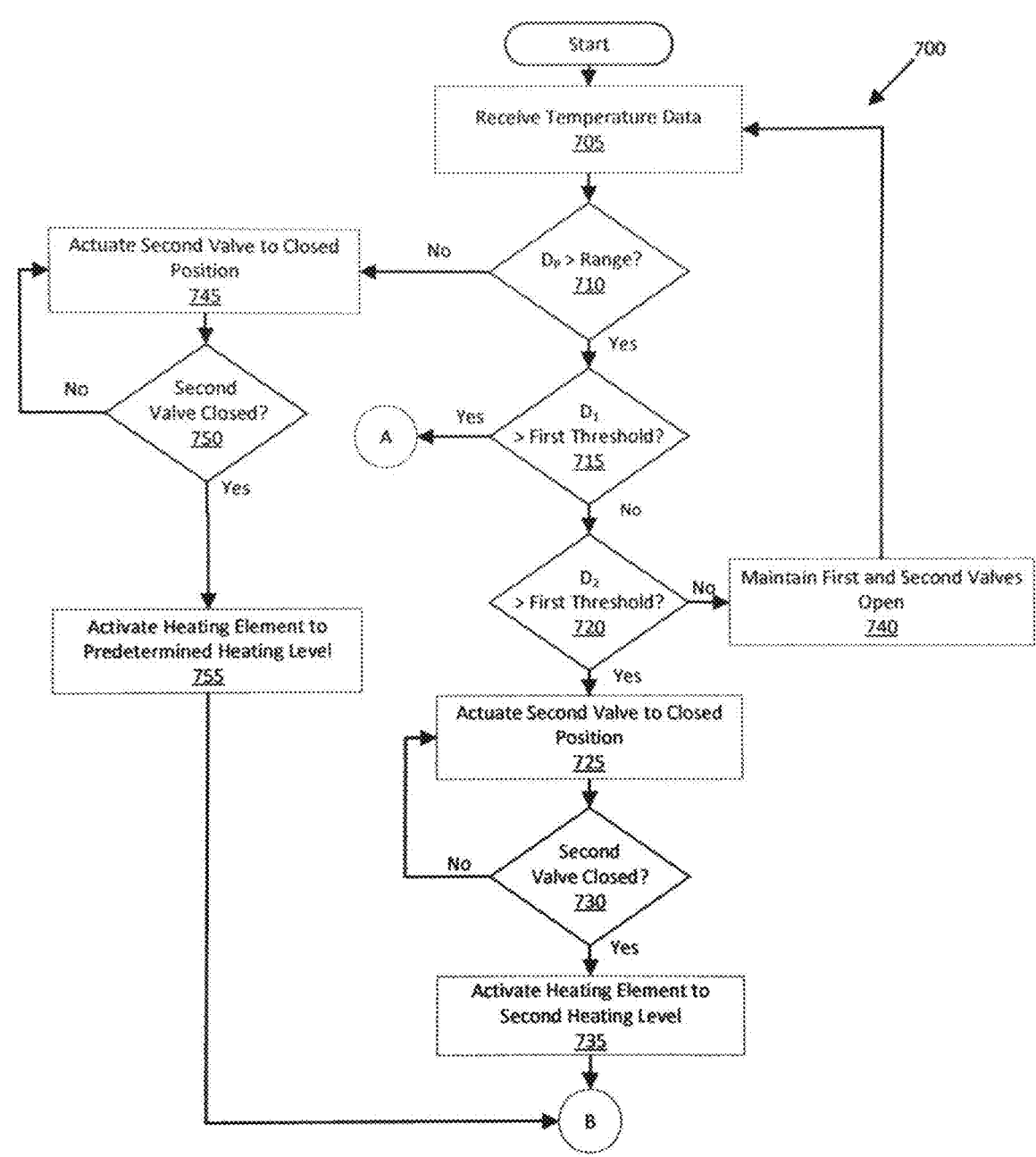
FIG. 7A is a first part of a flowchart of an example process for controlling a heating element and first and second valves of the sensor system.

FIG. 7A is a first portion of a flow chart illustrating an exemplary process 700 (the second portion being shown in FIG. 7B because the entire flowchart will not fit on a single drawing sheet) for controlling the heating element 20 and the valves 22, 24. The memory of the computer 26 stores executable instructions for performing the steps of the process 700 and/or programming can be implemented in structures such as mentioned above. As a general overview of the process 700, the computer 26 receives temperature data, actuates the second valve 24 to the closed position and activates the heating element 20 to a heating level based on the temperature data. The process 700 is performed independently for each heating element 20 and respective pair of valves 24, 22. Process 700 includes multiple blocks that can be executed in the illustrated order. Process 700 could alternatively or additionally include fewer blocks or can include the blocks executed in different orders.

The process 700 begins in a block 705. In the block 705, the computer 26 receives temperature data including the ambient temperature $T_{amb}$ from the ambient temperature sensor 76, the lens temperature $T_L$ from the lens thermocouple 70, and the panel temperatures $T_p$ from the respective panel thermocouples 68. The temperatures are all represented in the same units of temperature, e.g., degrees Celsius (° C.). The process 700 continues in a block 710.

In the block 710, the computer 26 determines whether at least one panel temperature $T_P$ is outside of a predetermined range relative to at least one other panel temperature $T_P$. For example, the computer 26 can compare the panel temperatures $T_P$ to each other and determine respective panel temperature differences $D_P$ between corresponding sets of panel temperatures $T_P$, e.g., via subtraction. The computer 26 can the compare the panel temperature differences $D_P$ to the predetermine range. The predetermined range specifies an upper bound for a panel temperature difference $D_P$ within which the panel temperatures $T_P$ are considered to be substantially identical. The predetermined range may be determined empirically, e.g., based on testing that allows for determining variations in panel temperatures $T_P$ due to noise, accuracy, resolution, etc., of the panel thermocouples 68. The predetermined range may be stored, e.g., in the memory of the computer 26. If each of the panel temperature differences $D_P$ are less than or equal to the predetermined range, then the process 700 continues in a block 715. If at least one of the panel temperature differences $D_P$ is greater than the predetermined range, then the process 700 continues in a block 745.

In the block 715, the computer 26 determines whether one panel temperature $T_P$ varies from the ambient temperature $T_{amb}$ by more than a first threshold. For example, the computer 26 can determine a first difference $D_1$ between the one panel temperature $T_P$ and the ambient temperature $T_{amb}$, e.g., via subtraction. The computer 26 can then compare the first difference $D_1$ to the first threshold. The first threshold can be determined empirically, e.g., based on testing that allows for determining a minimum temperature difference between the one panel temperature $T_P$ and the ambient temperature $T_{amb}$ that causes condensation to form on the lens 58, e.g., based on the ambient temperature $T_{amb}$, a humidity level, or other environmental conditions. The first threshold can be stored, e.g., in the memory of the computer 26. If the first difference $D_1$ is less than or equal to the first threshold, then the process 700 continues in the block 720. If the first difference $D_1$ is greater than the first threshold, then the process 700 continues in a block 760.

In the block 720, the computer 26 determines whether the lens temperature $T_L$ varies from the ambient temperature $T_{amb}$ by more than the first threshold. For example, the computer 26 can determine a second difference $D_2$ between the lens temperature $T_L$ and the ambient temperature $T_{amb}$, e.g., via subtraction. The computer 26 can then compare the second difference $D_2$ to the first threshold. If the second difference $D_2$ is less than or equal to the first threshold, then the process 700 continues in the block 745. If the second difference $D_2$ is greater than the first threshold, then the process 700 continues in a block 725.

In the block 725, the computer 26 actuates the second valve 24 to the closed position, as shown in FIG. 3A. The computer 26 maintains the first valve 22 in the open position, e.g., prevents actuation of the first valve 22 to the closed position. In this situation, the computer 26 may determine a presence of condensation on the lens 58. The process 700 continues in a block 730.

In the block 730, the computer 26 determines whether the second valve 24 is in the closed position. For example, the computer 26 can receive a signal from the second valve 24, e.g., the actuator, indicating the second valve 24 is in the closed position. If the computer 26 determines that the second valve 24 is in the closed position, then the process 700 continues in a block 735. Otherwise, the process 700 returns to the block 725.

In the block 735, the computer 26 activates the blower 46 to direct air towards the second valve 24 and actuates the heating element 20 to a second heating level $H_2$ to heat the air. For purposes of this disclosure, a "heating level" is a target heat output from the heating element 20. For example, the heating level can be an electrical current passing through the heating element 20. The electrical current for a heating element 20 can be controlled, e.g., by adjusting a voltage across the heating element 20. The second heating level $H_2$ may be determined based on the second difference $D_2$. For example, the computer 26 can look up a value for the second heating level $H_2$ via a look-up table, or the like. The memory of the computer 26 can store the look-up table with values of the second difference $D_2$ and with values of the second heating level $H_2$ corresponding to the values of the second difference $D_2$. For another example, the computer 26 can determine the second heating level $H_2$ as a function of the second difference $D_2$, i.e., $H_2=f(D_2)$. Both the values of the lookup table and the function are chosen according to experimentally determining what will cause the lens temperature $T_L$ to approach the ambient temperature $T_{amb}$ without overshooting, i.e., $T_L=T_{amb}$ at equilibrium. In general, the second heating level $H_2$ increases with the second difference $D_2$. The process 700 continues in the block 775.

In the block 740, the computer 26 maintains the first and second valves 22, 24 in the open position, e.g., prevents actuation of the first and second valves 22, 24 to the closed position, as shown in FIG. 3B. In this situation, the computer 26 may activate the blower 46, e.g., to clean and/or dry the lens 58, and prevent activation of the heating element 20. The computer 26 may determine an absence of ice and condensation from the lens 58 when the first and second differences $D_1$, $D_2$ are less than or equal to the first threshold. The process 700 returns to the block 705.

In the block 745, the computer 26 actuates the second valve 24 to the closed position. The block 745 is substantially the same as the block 725 of process 700 (with the exception that the computer 26 may determine a presence of ice on the lens 58) and therefore will not be described further to avoid redundancy. The process 700 continues in a block 750.

In the block 750, the computer 26 determines whether the second valve 24 is in the closed position. The block 750 is substantially the same as the block 730 of process 700 and therefore will not be described further to avoid redundancy. If the computer 26 determines that the second valve 24 is in the closed position, then the process 700 continues in a block 755. Otherwise, the process 700 returns to the block 745.

In the block 755, the computer 26 actuates the blower 46 to direct air towards the second valve 24 and actuates the heating element 20 to a predetermined heating level $H_P$ to heat the air. The predetermined heating level $H_P$ can be a predefined electrical current passing through the heating element 20. For example, the predetermined heating level $H_P$ can be a maximum electrical current for the heating element 20. The predetermined heating level $H_P$ may be stored, e.g., in the memory of the computer 26. The process 700 continues in the block 775.

Figure 7B:
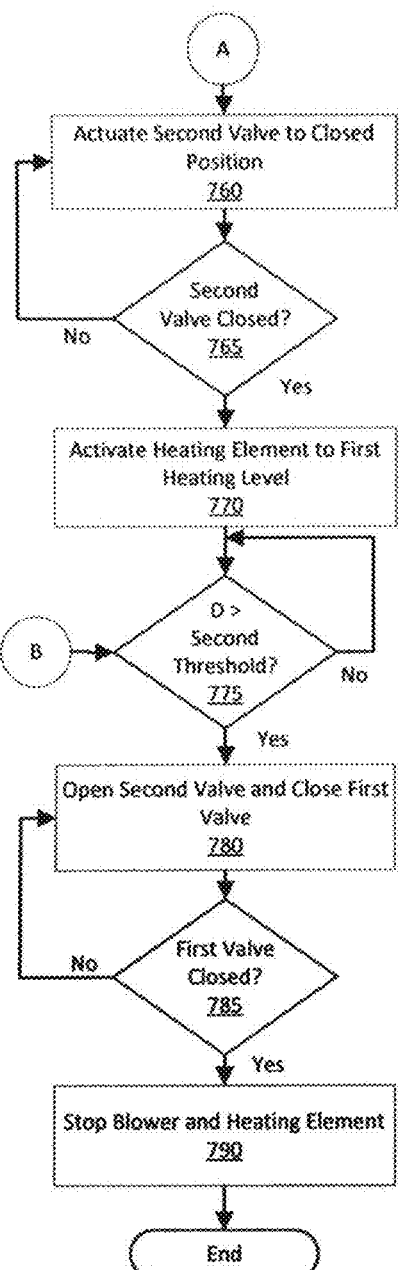
FIG. 7B is a second part of the flowchart of FIG. 7A.

Turning now to FIG. 7B, following the block 715 shown in FIG. 7A, in the block 760, the computer 26 actuates the second valve 24 to the closed position. The block 760 is substantially the same as the block 725 of process 700 and therefore will not be described further to avoid redundancy. The process 700 continues in a block 765.

In the block 765, the computer 26 determines whether the second valve 24 is in the closed position. The block 765 is substantially the same as the block 730 of process 700 and therefore will not be described further to avoid redundancy. If the computer 26 determines that the second valve 24 is in the closed position, then the process 700 continues in a block 770. Otherwise, the process 700 returns to the block 760.

In the block 770, the computer 26 activates the blower 46 to direct air towards the second valve 24 and actuates the heating element 20 to a first heating level $H_1$ to heat the air. The first heating level $H_1$ may be determined based on the first difference $D_1$. For example, the memory of the computer 26 can store the look-up table with values of the first difference $D_1$ and with values of the first heating level $H_1$ corresponding to the values of the first difference $D_1$. For another example, the computer 26 can determine the first heating level $H_1$ as a function of the first difference $D_1$, i.e., $H_1 = f(D_1)$. Both the values of the lookup table and the function are chosen according to experimentally determining what will cause the lens temperature $T_L$ to approach the ambient temperature $T_{amb}$ without overshooting, i.e., $T_L = T_{amb}$ at equilibrium. In general, the first heating level $H_1$ decreases with the first difference $D_1$. The process 700 continues in a block 775.

In the block 775, the computer 26 determines whether a difference D between an air temperature $T_2$ at the second valve 24 and an air temperature $T_1$ at the first valve 22 is greater than a second threshold. The computer 26 can determine the $T_2$ at the second valve 24 from the second temperature sensor 56 from block 705, and the computer 26 can determine the air temperature $T_1$ at the first valve 22 from the first temperature sensor 54 from block 705. The computer 26 can determine the difference D by comparing, e.g., subtracting, the respective air temperatures $T_1$, $T_2$. The computer 26 can then compare the difference D to the second threshold. The second threshold can be determined empirically, e.g., based on testing that allows for determining a minimum temperature difference between the air temperature $T_2$ at the second valve 24 and the air temperature $T_1$ at the first valve 22 that removes condensation from the lens 58. The second threshold can be stored, e.g., in the memory of the computer 26. If the difference D is less than or equal to the second threshold, then the process 700 remains in the block 775. If the difference D is greater than the second threshold, then the process 700 continues in a block 780.

In the block 780, the computer 26 actuates the first valve 22 to the closed position and actuates the second valve 24 to the open position, as shown in FIG. 3C. In this situation, the air may exit the duct 18 and exhaust via the air nozzle 48 across the lens 58, thereby heating the lens 58. The process 700 continues in a block 785.

In the block 785, the computer 26 determines whether the first valve 22 is in the closed position. The block 785 is substantially the same as the block 730 of process 700 and therefore will not be described further to avoid redundancy. If the computer 26 determines that the first valve 22 is in the closed position, then the process 700 continues in a block 790. Otherwise, the process 700 returns to the block 780.

In the block 790, the computer 26 stops the blower 46. Additionally, or alternatively, the computer 26 stops the heating element 20. After the block 790, the process 700 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A sensor system, comprising:
a sensor including a lens;
a plurality of panels connected to each other in a loop around the sensor;
a duct positioned to direct air towards the sensor;
a heating element disposed in the duct;
a first valve and a second valve disposed in the duct and spaced from each other along the duct, the first and second valves being selectively actuatable between an open position permitting airflow through the duct and a closed position blocking airflow through the duct; and a computer communicatively coupled to the heating element and the first and second valves;
wherein the computer is programmed to:
upon determining a first difference between one respective panel temperature and an ambient temperature is greater than a first threshold, actuate the second valve to the closed position and maintain the first valve in the open position;
actuate the heating element to a first heating level based on the first difference; and
based additionally on a second difference between a lens temperature and the ambient temperature being greater than the first threshold, actuate the second valve to the closed position and maintain the first valve in the open position.

2. The sensor system of claim 1, further comprising a housing including a chamber, wherein the sensor, the panels, and the duct are disposed in the chamber.

3. The sensor system of claim 2, further comprising an ambient temperature sensor communicatively coupled to the computer and spaced from the housing, wherein the computer is further programmed to receive the ambient temperature from the ambient temperature sensor.

4. The sensor system of claim 1, further comprising a lens thermocouple communicatively coupled to the computer and extending circumferentially around the lens, wherein the computer is further programmed to receive the lens temperature from the lens thermocouple.

5. The sensor system of claim 1, wherein the computer is further programmed to, upon determining that the first difference is less than or equal to the first threshold and that the second difference is less than or equal to the first threshold, maintain the first and second valves in the open position.

6. The sensor system of claim 1, wherein the computer is further programmed to actuate the heating element to a second heating level based on the second difference.

7. The sensor system of claim 1, further comprising a plurality of panel thermocouples communicatively coupled to the computer and embedded in respective panels, wherein the computer is further programmed to receive the panel temperatures from the respective panel thermocouples.

8. The sensor system of claim 1, wherein the computer is further programmed to, upon determining that a difference between an air temperature at the second valve and an air temperature at the first valve is greater than a second threshold, actuate the first valve to the closed position and the second valve to the open position.

9. The sensor system of claim 8, further comprising two temperature sensors communicatively coupled to the computer and disposed adjacent to the respective valves in the duct, wherein the computer is further programmed to receive the air temperatures at the respective valves from the respective temperature sensors.

10. The sensor system of claim 1, wherein the computer is further programmed to stop the heating element based on detecting the first valve in the closed position.

11. The sensor system of claim 1, further comprising a blower coupled to the duct, wherein the computer is communicatively coupled to the blower, the computer being further programmed to activate the blower based on detecting the second valve in the closed position.

12. The sensor system of claim 11, wherein the computer is further programmed to stop the blower based on detecting the first valve in the closed position.

13. The sensor system of claim 11, wherein the heating element is disposed between the blower and the first valve.

14. The sensor system of claim 1, wherein the first valve is disposed between the heating element and the second valve.

15. The sensor system of claim 1, wherein the computer is further programmed to:

upon determining that at least one panel temperature is outside of a predetermined range relative to at least one other panel temperature, actuate the second valve to the closed position and maintain the first valve in the open position; and activate the heating element to a predetermined heating level.

16. The sensor system of claim 15, further comprising a blower coupled to the duct, wherein the computer is communicatively coupled to the blower, the computer being further programmed to activate the blower based on detecting the second valve in the closed position.

17. The sensor system of claim 16, wherein the computer is further programmed to stop the blower based on detecting the first valve in the closed position.

18. The sensor system of claim 15, wherein the computer is further programmed to, upon determining that a difference between an air temperature at the second valve and an air temperature at the first valve is greater than a second threshold, actuate the first valve to the closed position and the second valve to the open position.

19. The sensor system of claim 18, wherein the computer is further programmed to stop the heating element based on detecting the first valve in the closed position.

20. A sensor system, comprising:

a sensor;

a plurality of panels connected to each other in a loop around the sensor;

a duct positioned to direct air towards the sensor;

a heating element disposed in the duct;

a first valve and a second valve disposed in the duct and spaced from each other along the duct, the first and second valves being selectively actuatable between an open position permitting airflow through the duct and a closed position blocking airflow through the duct; and a computer communicatively coupled to the heating element and the first and second valves;

wherein the computer is programmed to:

upon determining a first difference between one respective panel temperature and an ambient temperature is greater than a first threshold, actuate the second valve to the closed position and maintain the first valve in the open position;

actuate the heating element to a first heating level based on the first difference; and upon determining that a difference between an air temperature at the second valve and an air temperature at the first valve is greater than a second threshold, actuate the first valve to the closed position and the second valve to the open position.

21. A sensor system, comprising:

a sensor;

a plurality of panels connected to each other in a loop around the sensor;

a duct positioned to direct air towards the sensor;

a heating element disposed in the duct;

a first valve and a second valve disposed in the duct and spaced from each other along the duct, the first and second valves being selectively actuatable between an open position permitting airflow through the duct and a closed position blocking airflow through the duct; and a computer communicatively coupled to the heating element and the first and second valves;

wherein the computer is programmed to:

upon determining a first difference between one respective panel temperature and an ambient temperature is greater than a first threshold, actuate the second valve to the closed position and maintain the first valve in the open position;

actuate the heating element to a first heating level based on the first difference; and stop the heating element based on detecting the first valve in the closed position.

22. A sensor system, comprising:

a sensor;

a plurality of panels connected to each other in a loop around the sensor;

a duct positioned to direct air towards the sensor;

a heating element disposed in the duct;

a first valve and a second valve disposed in the duct and spaced from each other along the duct, the first and second valves being selectively actuatable between an open position permitting airflow through the duct and a closed position blocking airflow through the duct;

a blower coupled to the duct; and a computer communicatively coupled to the heating element, the first and second valves, and the blower;

wherein the computer is programmed to:

upon determining a first difference between one respective panel temperature and an ambient temperature is greater than a first threshold, actuate the second valve to the closed position and maintain the first valve in the open position;

actuate the heating element to a first heating level based on the first difference; and activate the blower based on detecting the second valve in the closed position.

23. A sensor system, comprising:

a sensor;

a plurality of panels connected to each other in a loop around the sensor;

a duct positioned to direct air towards the sensor;

a heating element disposed in the duct;

a first valve and a second valve disposed in the duct and spaced from each other along the duct, the first and second valves being selectively actuatable between an open position permitting airflow through the duct and a closed position blocking airflow through the duct; and a computer communicatively coupled to the heating element and the first and second valves;

wherein the computer is programmed to:

upon determining a first difference between one respective panel temperature and an ambient temperature is greater than a first threshold, actuate the second valve to the closed position and maintain the first valve in the open position;

actuate the heating element to a first heating level based on the first difference;

upon determining that at least one panel temperature is outside of a predetermined range relative to at least one other panel temperature, actuate the second valve to the closed position and maintain the first valve in the open position; and activate the heating element to a predetermined heating level.

* * * * *